(12) United States Patent
Zetterlund

(10) Patent No.: US 12,523,281 B2
(45) Date of Patent: Jan. 13, 2026

(54) CVT WITH IDLE AND REVERSE FUNCTION

(71) Applicant: Karl Zetterlund, Houston, TX (US)

(72) Inventor: Karl Zetterlund, Houston, TX (US)

( * ) Notice: Subject to any disclaimer, the term of this patent is extended or adjusted under 35 U.S.C. 154(b) by 0 days.

(21) Appl. No.: 18/445,153

(22) Filed: May 3, 2023

(65) Prior Publication Data
US 2024/0369129 A1    Nov. 7, 2024

(51) Int. Cl.
*F16H 15/08* (2006.01)
*F16H 15/40* (2006.01)
*F16H 37/12* (2006.01)

(52) U.S. Cl.
CPC ............. *F16H 37/12* (2013.01); *F16H 15/08* (2013.01); *F16H 15/40* (2013.01)

(58) Field of Classification Search
CPC .......... F16H 15/08; F16H 15/10; F16H 15/40; F16H 37/12
USPC ........................................ 476/18, 38, 40, 54
See application file for complete search history.

(56) References Cited

U.S. PATENT DOCUMENTS

| | | | | |
|---|---|---|---|---|
| 934,731 | A * | 9/1909 | Jenkins | F16H 15/20 476/50 |
| 944,872 | A * | 12/1909 | Jenkins | F16H 15/28 476/50 |
| 2,682,776 | A * | 7/1954 | Morgan | F16H 15/00 475/191 |
| 2,693,709 | A * | 11/1954 | Newell | G06G 3/08 476/38 |
| 2,737,820 | A * | 3/1956 | Collar | F16H 15/28 476/55 |

FOREIGN PATENT DOCUMENTS

JP             56113854 A    *  9/1981

* cited by examiner

*Primary Examiner* — William C Joyce
(74) *Attorney, Agent, or Firm* — David J. Connaughton, Jr.; Justin P. Tinger; Yafei Xue

(57) ABSTRACT

A continuous variable transmission, Variator, which works on the ball and disc principle whereby the ball is in a fixed position, free to rotate in any direction, and the discs move to and from each other causing output shaft to either idle or rotate of various speeds including reverse as directed by the attached control device without need for additional gears and clutches.

2 Claims, 4 Drawing Sheets

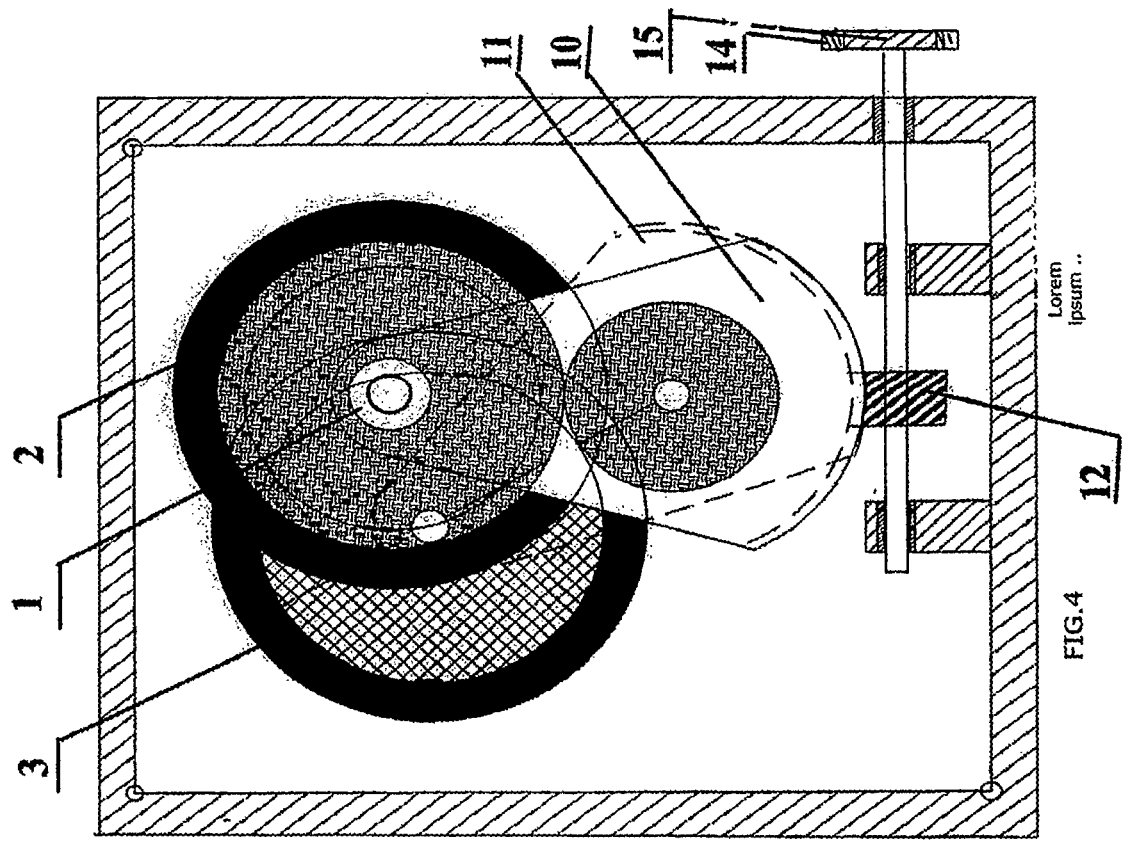

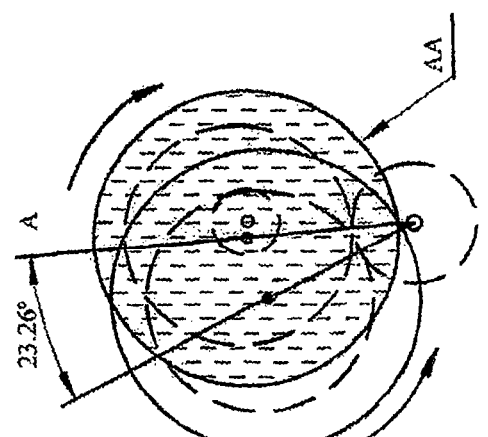
FIG. 5A
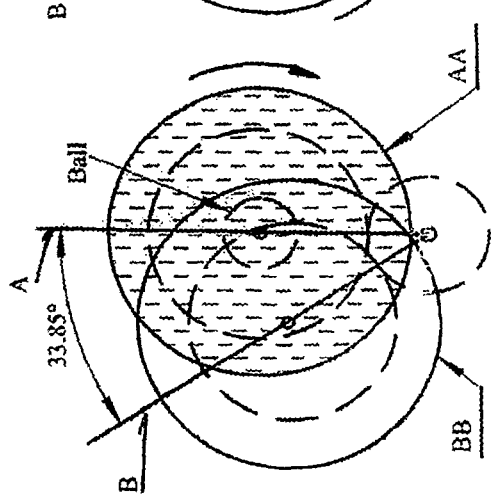
FIG. 5B
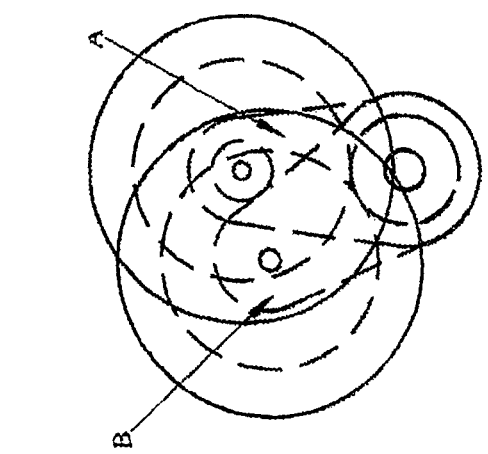
FIG 5C
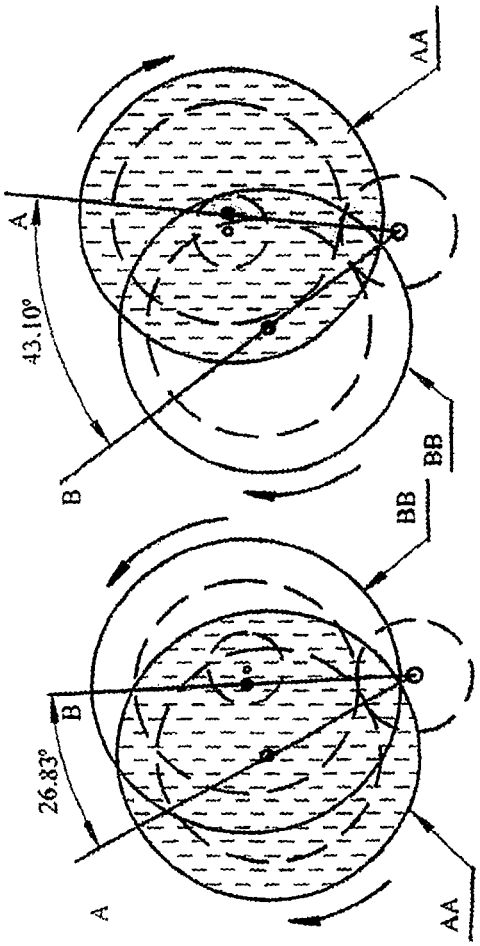
FIG. 5D
FIG. 5E
FIG. 5F

CVT WITH IDLE AND REVERSE FUNCTION

BACKGROUND

Not applicable.

SUMMARY

Not applicable.

BRIEF DESCRIPTION OF DRAWINGS

FIG. 3 indicates gear ratios for different positions of swing arms relative to the ball.

FIG. 4 shows the invention with only one swing arm.

FIG. 5A is a structural diagram showing a position where the discs center points passed each other and thus disc on swing arm B rotate faster than the disc on swing arm A.

FIGS. 5B-5F are structural diagrams showing the different respective positions and movements of the two discs.

FIGS. 3,4 and 5A-F.

Figure 2:
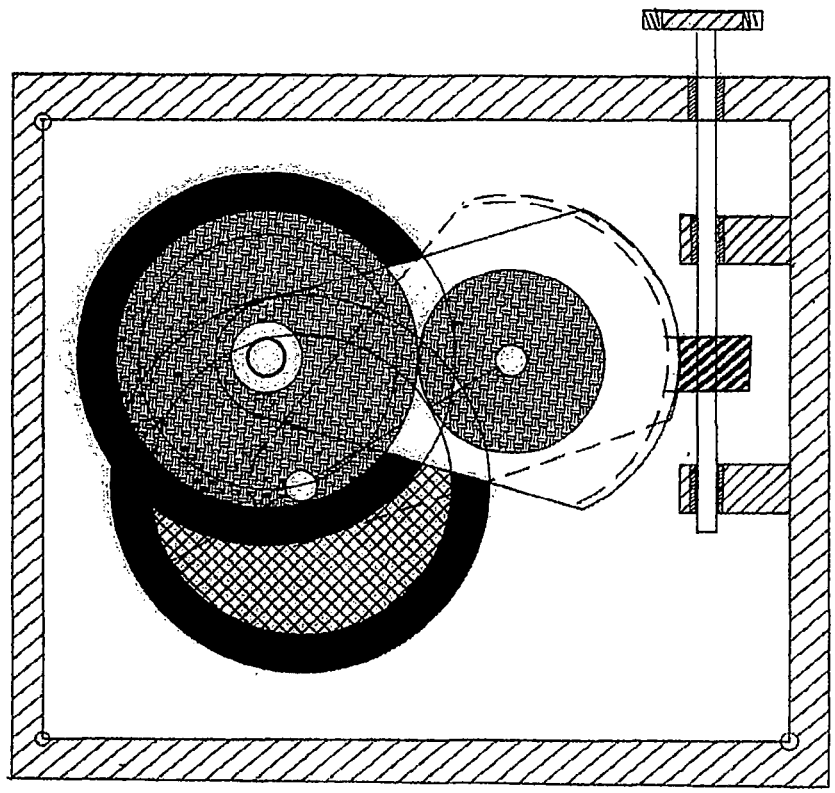
FIG. 2 is a general overview with parts identified by numbers.

Ref FIG. 2

PART SPECIFICATION

1 Ball
2 Rotating disc, power input
3 Rotating disc, power output
4 Shaft, power input
5 Shaft, power output
6 Gear wheel, power input
7 Gear wheel, Power output
8 Gear wheel connected to rotating disc, power input
9 Gear wheel connected to rotating disc, power output
10 Swing arm, power input
11 Swing arm, power output
12 Gear wheel for position adjustment swing arm, power input
13 Gear wheel for position adjustment swing arm, power output
14 Gear wheel for position adjustment both swing arms simultaneously
15 Gear wheels, one each side of the control wheel (14) for positioning Swing arms
16 Device for control of pressure between disc (3) and ball (1)
17 Device for control of pressure between disc (2) and ball (1)

DETAILED DESCRIPTION

Function:

A ball (1) is inserted in a bearing assembly where it can rotate in any direction as controlled by two rotating discs. On each side of the ball are disc (2) and (3) located. Each disc are covered with high friction material on the side touching the ball. Each disc is connected to a gear wheel (8) and (9) via a shaft and which shafts are freely rotating and also, lateral moveable via bearings in swing arms (10) and (11) in order allow for pressure adjustment for the disc against the ball.

Each swing arm can rotate on input shaft (4) and output shaft (5) respectively.

Each swing arm is provided with gear teeth connected to a positioning controlling gear (12) and (13) respectively.

Input and output shafts (4) and (5) are attached to a gear wheel (6) and (7), which are connected to gear wheel (8) and (9) respectively.

Each gear wheel (12) and (13) are connected to a speed variation common control gear (14) via gears (15) on shafts.

When control gearwheel (14) is rotated the swing arms will rotate to or from each other depending of direction of rotation whilst swing arms simultaneously changing relative position between gear wheel (9) and (7) even whilst rotating.

FIG. 3, indicates various speed configurations when swing arms are moving to and from each other.

FIG. 3

Figure 1:
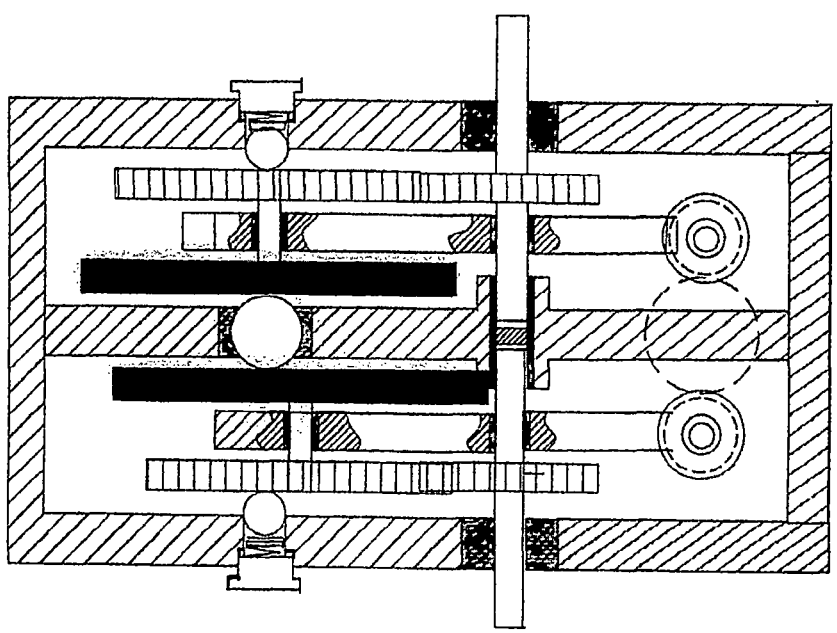
FIG. 1 is a general overview of the invention.

FIG. 1, indicates swing arms named A and B respectively which on following figures are only indicated as line A or B.

FIG. 2, show swing arm A with the disc in neutral position relative to the ball because the center of the disc corresponds to the center of the ball. When disc on swing arm A rotates the ball will not rotate and thus the disc on swing arm B will not rotate either.

FIG. 3, show swing arm A rotated partly to the left and thus swing arm B rotated partly to the right. The disc on swing arm A causes the ball to rotate and the disc on swing arm B to rotate in the opposite direction at a slower speed than the disc on swing arm A.

FIG. 4, show both discs in same position which will cause the discs to rotate at same speed.

FIG. 5A, show a position where the discs center points passed each other and thus disc on swing arm B rotate faster than the disc on swing arm A.

FIGS. 5B-5F, show the different respective positions and movements of the two discs.

Figure 6:
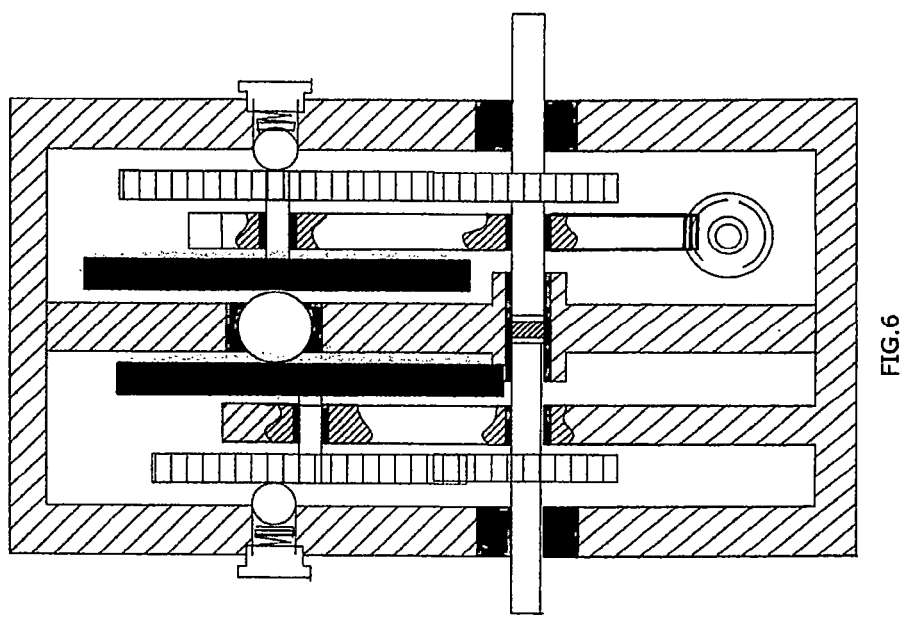
FIG. 6 is a structural diagram showing a position where the discs are positioned further away from each other from the starting neutral point, as per FIG. 2. This will cause disc B to rotate in reverse direction as compared to i.e.

FIG. 6, show a position where the discs are positioned further away from each other from the starting neutral point as per FIG. 2. This will cause disc B to rotate in reverse direction as compared to i.e. FIGS. 3,4 and 5.

Figure 7:
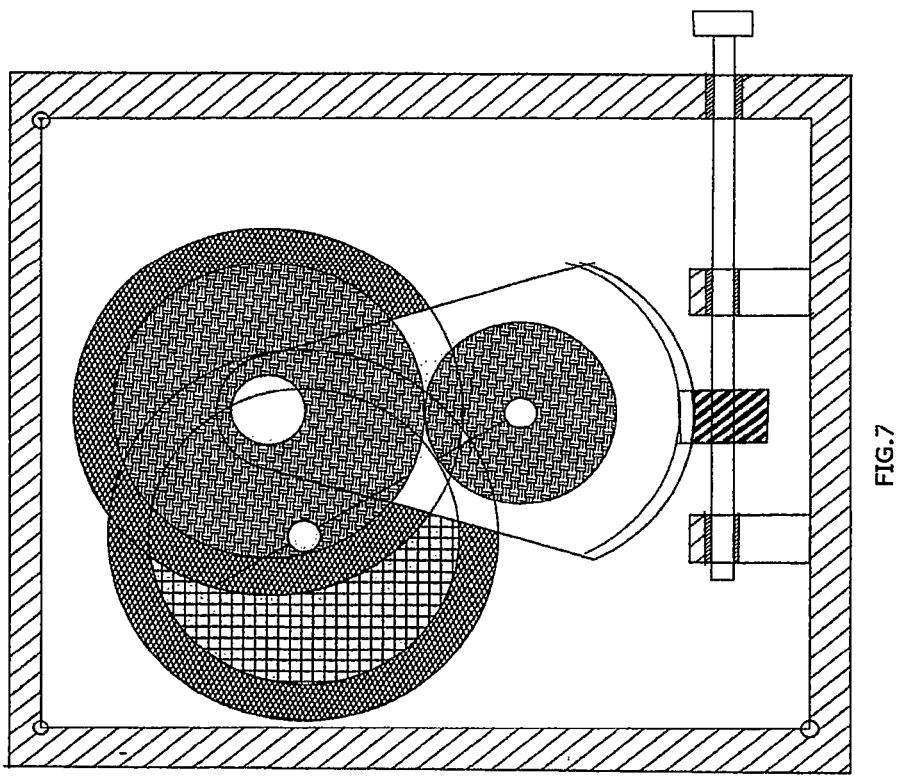
FIG. 7 is a cross-sectional side view diagram of the presently disclosed device.

FIG. 7, shows a cross-sectional side view diagram of the presently disclosed device.

FIG. 4

This drawing show the invention with only one swing arm which means that input needed of the speed variation control gear for moving the swing arm is far greater than with two swing arms moving to and from each other for achieving same result.

The invention claimed is:

1. A continuous variable transmission variator, comprising:
   a freely rotatable ball fixedly located between two rotatable flat, high-friction-treated discs, the discs being fitted on swingarms freely rotating on an input and output shafts, enabling the discs to move to and from each other, thus changing relative positions with respect to each other;
   wherein a center of a first disc of the two discs faces a center of the ball, a center of a second disc of the two discs is offset from the center of the ball;
   wherein each of the two discs is rotatably connected to one of the input or the output shaft via a first plurality of wheels or a second plurality of wheels, each of the two discs freely rotating on one of the swingarms;

wherein the discs fitted on the swingarms change relative position on the input and output shafts when the swingarms are moved;

and wherein, when the ball is in a center position of the first disc of the two discs, the input or output shaft connected to the second disc of the two discs is not rotating, and when the first disc passes the centered position, the second disc rotates in an opposite direction with respect to the first disc.

2. The continuous variable transmission variator of claim 1, wherein the swingarms are fitted with a gear track connected to a gear wheel on one of the input and output shafts, with a second gear wheel fitted at an end of the one of the input and output shaft, and a center controller gear wheel connected to both the swingarms;

wherein when rotating the center controller gear wheel the swingarms move towards or away from each other, depending on whether a forward, neutral, or reverse movement is required for the output shaft.

* * * * *